United States Patent [19]

Fiedler

[11] Patent Number: 5,381,289
[45] Date of Patent: Jan. 10, 1995

[54] SUSPENSION FOR IN-LINE OFFSET HEAD MOUNTING

[75] Inventor: Richard G. Fiedler, Hutchinson, Minn.

[73] Assignee: Hutchinson Technology Incorporated, Hutchinson, Minn.

[21] Appl. No.: 23,620

[22] Filed: Feb. 26, 1993

[51] Int. Cl.⁶ ............................................ G11B 5/48
[52] U.S. Cl. ........................................ 360/104; 360/109
[58] Field of Search .................... 360/104, 106, 109

[56] References Cited

U.S. PATENT DOCUMENTS

| | | | |
|---|---|---|---|
| 3,984,873 | 10/1976 | Pejcha | 360/105 |
| 4,107,748 | 8/1978 | Ho | 360/104 |
| 4,422,115 | 12/1983 | Spash | 360/104 |
| 4,443,824 | 4/1984 | Frater et al. | 360/104 |
| 4,937,693 | 6/1990 | Connolly et al. | 360/106 |
| 4,994,931 | 2/1991 | Foote | 360/106 |
| 5,172,286 | 12/1992 | Jurgenson | 360/104 |
| 5,268,805 | 12/1993 | Peng et al. | 360/106 |

Primary Examiner—John H. Wolff
Attorney, Agent, or Firm—Faegre & Benson

[57] ABSTRACT

Two HSAs are mounted to a single rigid actuator arm such that the HSAs interleave one another, with a transducer head of one HSA projecting through an aperture on the load beam of the other HSA. Thus, the HSA mounted to the top side of the rigid actuator arm will access the disk below the rigid actuator arm itself, while the HSA mounted on the bottom side of the rigid actuator arm will access the disk above the arm itself. Various types of HSAs can be used with the disclosed interleaving or interfitting. Decreased disk-to-disk spacing is achieved by the disclosed arrangement.

41 Claims, 4 Drawing Sheets

SUSPENSION FOR IN-LINE OFFSET HEAD MOUNTING

FIELD OF THE INVENTION

The present invention relates to an improved head suspension assembly (HSA) for use in dynamic storage devices or rigid disk drives. More specifically, this invention provides for specific improvements to the construction of a load beam of an HSA to allow a paired set of load beams attached to a single rigid actuator arm to interleave or interfit, thereby significantly reducing disk-to-disk spacing in dynamic storage devices and rigid disk drives.

BACKGROUND OF THE INVENTION

Manufacturers and designers of drive systems are continually looking for ways to increase storage capacity while maintaining specific form factors for drive designs. There is a strong market for HGA (Head Gimbal Assembly) options that would allow decreased disk-to-disk spacing in the hard disk stack.

These manufacturers and designers are also searching for ways to increase yields through the drive manufacturing process and to increase product reliability. One option that many drive designers are using is to add a lifting mechanism to dynamically lift and lower the transducer head toward and away from the disk. The use of lifting mechanisms reduces wear on the HGA and on the disk during start-up and stop. A lifter thus adds reliability to the drive. Lifting devices are also used to hold the transducer head away from the disk during drive assembly. With increasingly closer disk spacing, there is very little clearance for lifters and for suspension clearance. There is also a potential for defects to occur if the lifter contacts the disk or if the transducer head is not properly lowered onto the disk.

The present invention provides a new load beam/HGA concept that offers:

Significantly diminished disk-to-disk spacing.

Simplified lifting method requiring only a single lifter extension for a paired set of HGAs attached to the same rigid actuator arm. The lifter raises or lifts each suspension away from its respective disk by entering between the two suspensions attached to the same rigid actuator arm.

Improved resonance characteristics due to the use of upright rails on the suspension.

Other workers in this field have proposed different types of staggered placement of HGAs to provide decreased disk-to-disk spacing. For example, U.S. Pat. No. 4,937,693, assigned to Hewlett-Packard Co., describes HGAs mounted in circumferentially spaced pairs on individual projections of a rotatable actuator, with the active faces of the heads pointing in opposite directions. This Hewlett-Packard patent and the present invention both effectively offer significant lowering of disk spacing and both position the transducer heads so that they are not one above the other in the head stack. However, the present invention allows both suspensions and their attached heads to be mounted in a direct line from the gap of the heads to the pivot of the E-block assembly. This configuration offers the ability to design for lower mass and inertia of the actuator assembly. Also, the design of the Hewlett-Packard patent requires the transducer heads to be mounted 90° to the load beam and, if the transducer heads are mounted in line with the load beam, significant disk surface can not be utilized.

U.S. Pat. No. 4,443,824, assigned to IBM, describes a rigid actuator arm formed with exterior parallel arms supporting two transverse bridge elements spaced along the length of the arms so that each bridge supports two opposed load beams each provided with a magnetic transducer transducer head.

Current lower mass and inertia actuator designs require less power, offer better head positioning accuracy and faster access capabilities. The mounting of the suspensions in line with the pivot of the actuator and using rotary actuation is currently the most common way of configuring the actuator relative to the disks. Thus, the retro fit of the concept of the present invention requires significantly less drive design changes and allows the use of traditional form factors for drives with existing rotary actuator designs. The concept of the present invention permits the transducer head to be attached in line with the load beam, which is most common for current suspension/flexure designs.

A lifting mechanism can easily be implemented into the design of the present inventive suspension. The lift mechanism may be a stationary comb to which the present inventive actuator/suspension configuration can access directly as the actuator is moved toward the outer edge of the disk. The lift mechanism requires only one prong per paired suspension. By having paired suspensions lifted at the same time and on the same position of the comb ramp, the dynamic lifting and loading of the heads to the disk is uniform and consistent.

BRIEF DESCRIPTION OF THE INVENTION

The basic configuration of the head suspension according to the present invention comprises two HGAs mounted to a single rigid actuator arm in such a way that the HGAs interleave or interfit with one another. Due to this interleaving or interfitting, the HGA mounted to an upper surface of the rigid actuator arm is in flying relationship to the disk surface below the rigid actuator arm itself, while the HGA mounted on the opposing lower surface of the rigid actuator arm is in flying relationship to the disk surface above the rigid actuator arm itself. This is illustrated in FIGS. 1, 5 and 6.

Preferably, the two HGAs are offset on the rigid actuator arm in relation to the axis created by the E-block pivot and the swage hole for the arm/suspension. The offset is such that the point of attachment of one of the transducer heads to a first surface of the rigid actuator arm is positioned distally relative to the point of attachment of the other slider to the opposing surface of that same rigid actuator arm. Each HGA is mounted at a different location from the E-block pivot so that the transducer heads have the proper off-set in relation to their respective disks. Note FIGS. 1, 2 and 4–6. As an alternative, one suspension can be made shorter than the other to allow both HGAs to be mounted at the same axis on the rigid actuator arm relative to each other, as illustrated in FIG. 3.

It is preferable to use HGAs that are generally as identical to each other as possible to maintain similar suspension characteristics. The offset of the points of attachments of each HGA is minimized, while maintaining enough clearance between the flexure of the HGA closest to the E-block pivot and the transducer head of the HGA furthest from the pivot. This is illustrated in FIG. 2.

According to the present invention, a suspension is formed with a window or aperture in the center of a first load beam at the position of the transducer head of the opposite HGA. This window is sized and constructed so than the transducer head of the opposing load beam projects or juts out through the first load beam with the proper clearances, as illustrated in FIGS. 2 and 3. Only one of the suspensions is required to have a window. However, to maintain similarity in resonance characteristics for the two HGAs, both HGAs are provided with a similar sized and constructed window and are otherwise formed as identical to each other as possible.

The offset in the mounting of the HGAs to the rigid actuator arm requires a slight step in the end of the rigid actuator arm to reduce rigid actuator arm thickness, as illustrated in FIG. 4. The step is formed on the surface of the rigid actuator arm to which the suspension mounted closest to the E-block pivot is attached, in order to provide rail and rolling clearance for that suspension.

When the transducer heads on each rigid actuator arm according to the present invention are in flying position relative to their respective disks, the top sides of each transducer head (the side bonded to the flexure) are approximately on the same plane, as illustrated in FIG. 5. When the transducer heads are lifted away from their respective disk, the transducer heads then overlap each other, as shown in FIG. 6. This illustrates the significantly closer disk-to-disk spacing and proper loading clearances possible according to the present invention.

To lift the transducer heads away from their respective disks, a single wedge shaped lifter is inserted between the two suspensions closer to the rigid actuator arm and moved towards the transducer head ends. This motion towards the transducer head end of the suspension further separates the load beams and pulls each transducer head away from its respective disk, as seen in FIGS. 5 and 6.

Using the HGA/arm construction according to the present invention allows the use of upright rail load beams for lower disk spacing applications. Load beams having upright rail configurations are known to demonstrate better resonance characteristics.

DETAILED DESCRIPTION OF THE INVENTION

Figure 1:
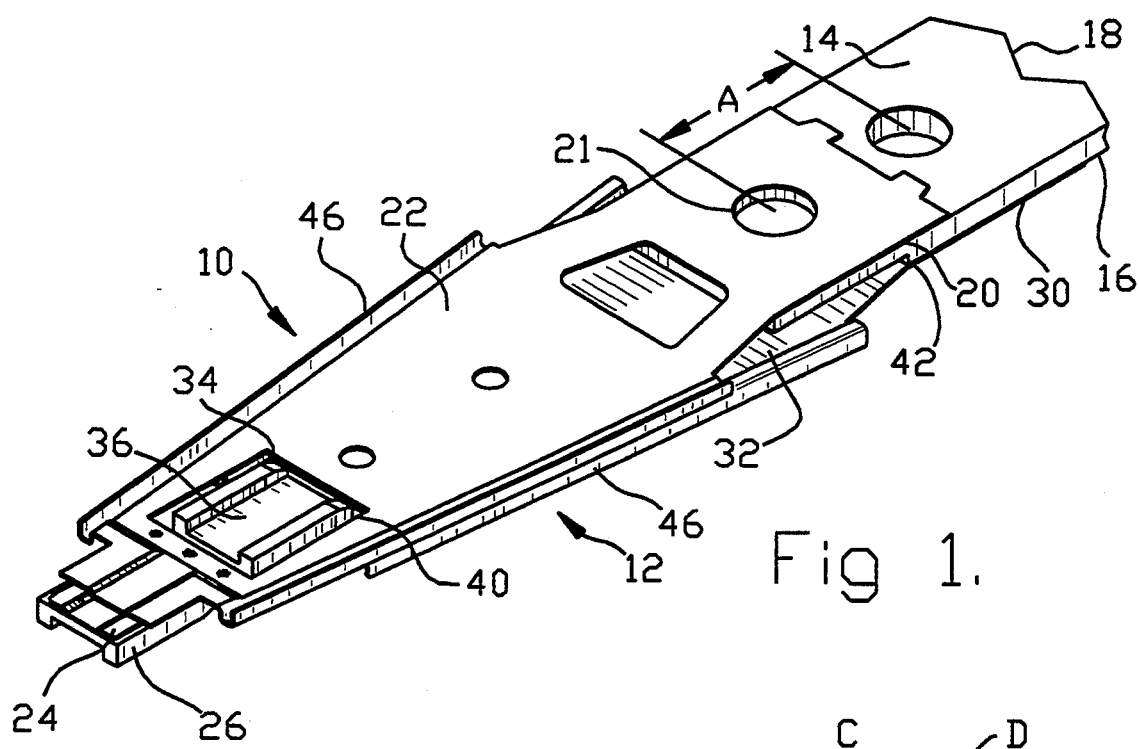
FIG. 1 is a perspective view of a paired set of HGAs according to the present invention, shown off-set relative to each other with the transducer head of the first HGA exposed through a window in the surface of the second load beam.

FIGS. 1, 2 and 4–6 illustrate a paired set of upper and lower HGAs 10, 12 attached to opposing surfaces 14, 16 of a rigid actuator arm 18. Upper HGA 10 includes first base plate 20, attached to upper surface 14 of rigid actuator arm 18 through opening 21, first load beam 22, first flexure 24 and first head 26 positioned in read/write relationship to first disk 28. Lower HGA 12 includes second base plate 30, attached to lower surface 16 of rigid arm 18 through opening 31, second load beam 32, second flexure 34 and second head 36 positioned in read-write relationship to second disk 38. Thus, attachment of upper HGA 10 to rigid actuator arm 18 is along axis C and attachment of lower HGA 12 to rigid actuator arm 18 is along axis D.

First load beam 22 is provided with window 40 sized and constructed so that second head 36 can project or jut out therethrough. Note that the position of attachment of first base plate 20 to upper surface 14 of rigid actuator arm 18 is distally off-set in relation to the position of attachment of second base plate 30 to lower surface 16 of rigid actuator arm 18. Note also that lower surface 16 of rigid actuator arm 18 is provided with step 42 to reduce the thickness of rigid actuator arm 18 to provide clearance for second load beam 32, as better illustrated in FIG. 4 (shown in inverted position from the position shown in FIGS. 1 and 2).

Figure 2:
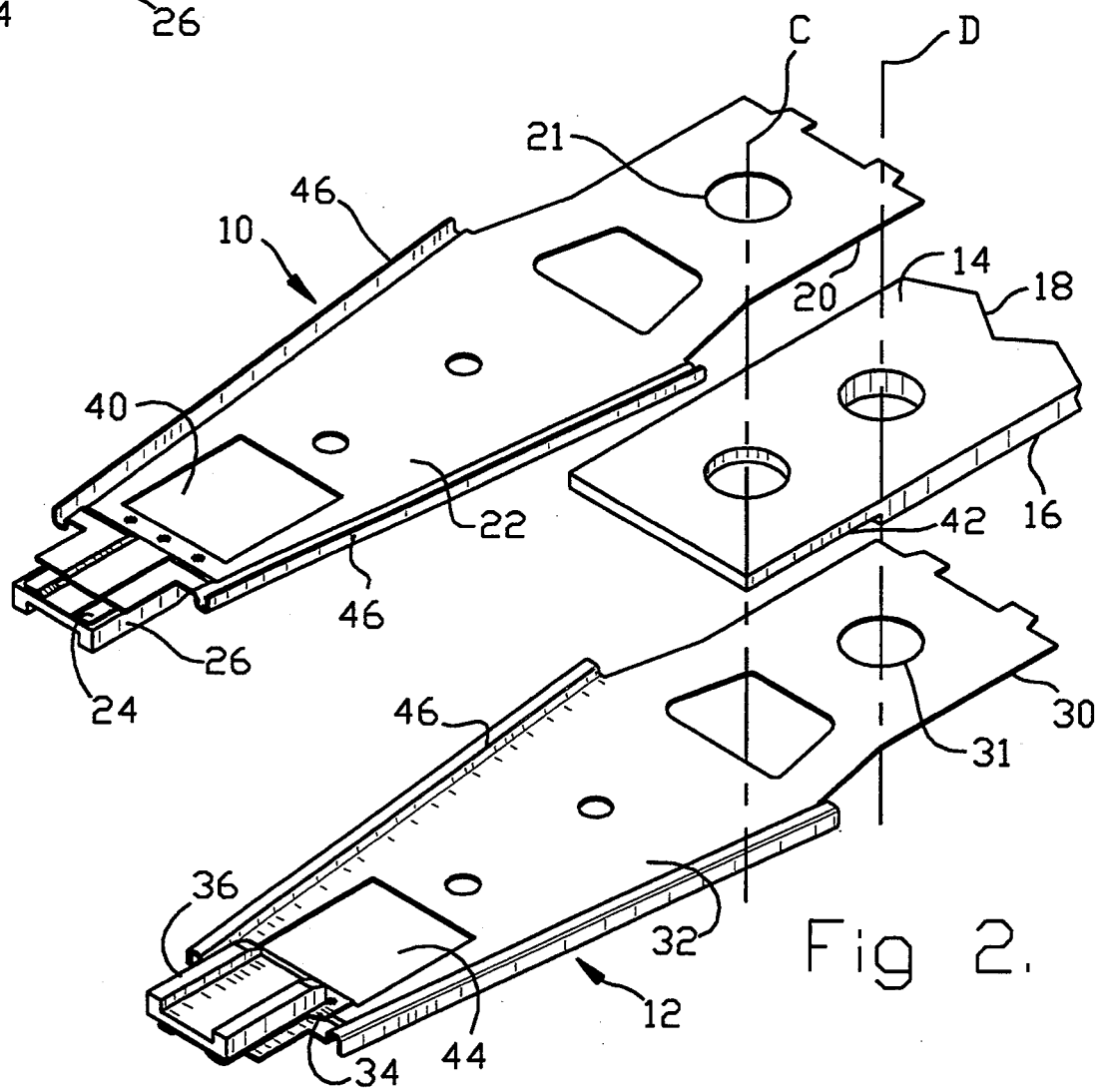
FIG. 2 is an exploded view of the assembly of FIG. 1.

As shown in FIGS. 1 and 2, first load beam 22 is provided with window 40 positioned slightly behind first flexure 24 to permit second head 36 to project or jut out therethrough and to avoid any interference with the function of first head 26. Although it is only necessary for first load beam 22 to be provided with window 40 in order for the interfitting arrangement of the HGAs according to the present invention to function in the described manner, it is preferred for second load beam 32 to also be provided with window 44, so that two HGAs 10, 12 are essentially identical to each other in order to have essentially identical resonance characteristics. Preferably, each load beam 22, 32 is formed with rails 46 extending generally from the proximal to the distal end of each load beam 22, 32.

The following specific parameters according to the present invention have been found suitable for a representative paired set of HGAs, described with regard to FIGS. 1, 2 and 4–6, such as described by the IDEMA standards as H2-91 (Specification for 70% micro thin film slider). Rigid actuator arm 18 at its proximal end can be 0.020 inch thick. Window 40, 44 dimensions of 0.132 inch by 0.108 inch provide clearance of 0.005 to 0.015 inch on all sides relative to respective heads 26, 36. When first and second base plates 20, 30 are off-set relative to each other, the off-set distance A can be in the range of 0.117–0.200 inch, preferably about 0.152 inch, so that the off-set distance B between respective heads 26, 36 is approximately 0.040 inch. Rail dimensions will depend on specific disk-to-disk spacing and clearances needed for lifting and loading the heads to and away from their respective disks. For other types of HGAs, specific dimensions and tolerances can readily be determined by those of skill in this art according to the specific application intended.

Figure 5:
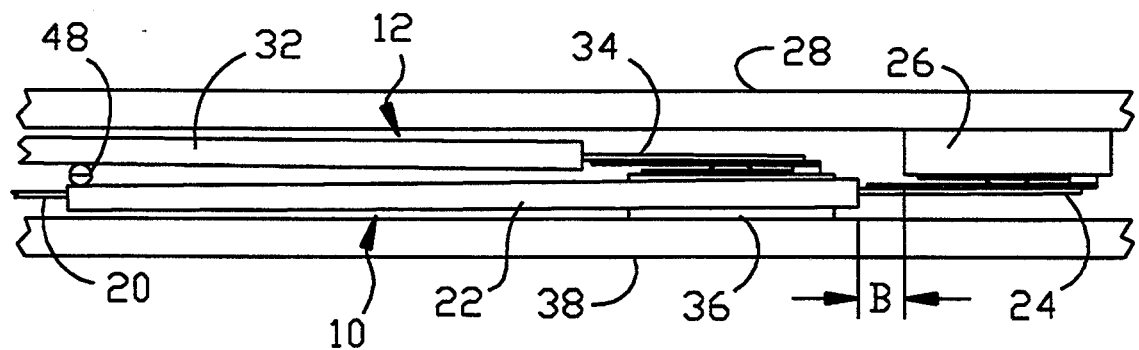
FIG. 5 is a side profile view showing the initial position of insertion of a lifter mechanism between a paired set of HGAs near the distal ends of the load beams according to the present invention.
Figure 6:
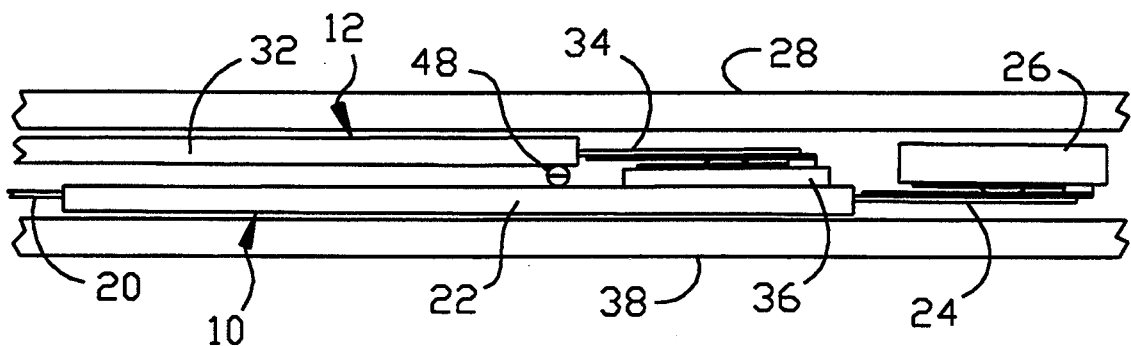
FIG. 6 is a side profile view, similar to FIG. 5, showing the lifter mechanism moved toward the transducer head ends of the HGAs to move the transducer heads away from their respective disks.

To lift heads 26, 36 away from their respective disks 28, 38, arm 48 is inserted between load beams 22, 32 near the proximal end of the load beam 22 (see FIG. 5), and moved toward the head 26, 36 ends (see FIG. 6). This motion towards the head 26, 36 end of load beams 22, 32 further separates load beams 22, 32 and pulls heads 26, 36 away from their respective disks 28, 38, as can be seen in FIGS. 5 and 6.

Figure 3:
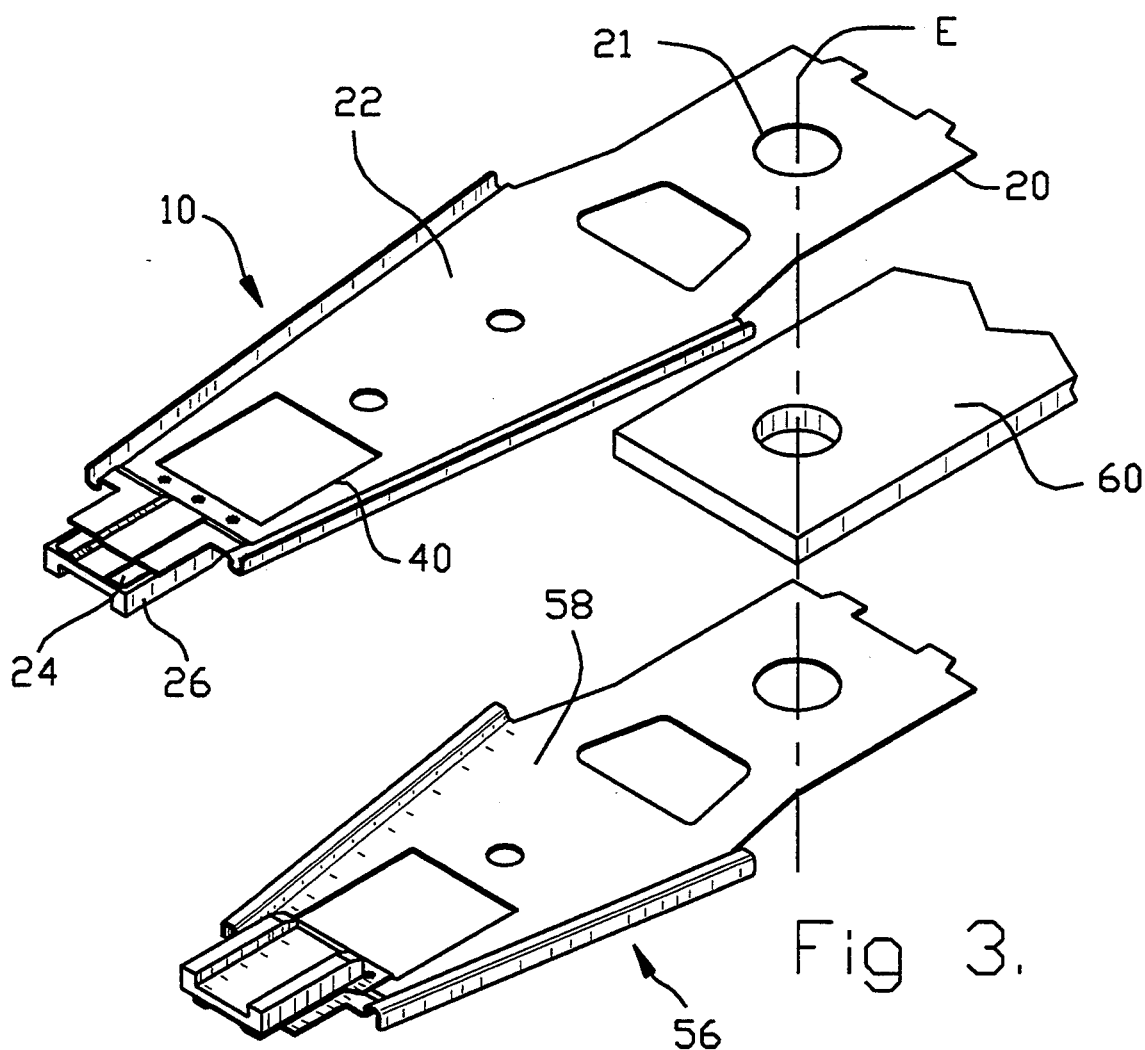
FIG. 3 is a perspective view of an alternative paired set of HGAs according to the present invention, wherein the load beams are of unequal length to permit attachment to the rigid actuator arm along a common vertical axis.
Figure 4:
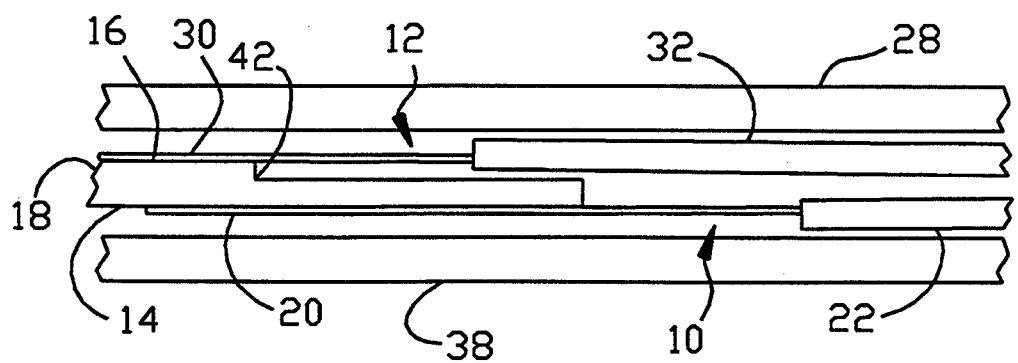
FIG. 4 is a side profile view of an assembly of a paired set of HGAs, shown in inverted position from FIGS. 1 and 2, showing the rigid actuator arm stepped to reduce its distal thickness.

According to an alternative embodiment of the present invention, as illustrated in FIG. 3, lower HGA 56 may be formed with a shorter load beam 58 so that both upper 10 and lower 56 HGAs may be attached to rigid actuator arm 60 along common axis E. Note than when load beams of longer 22 and shorter 58 lengths are used, rigid actuator arm 60 can be formed with a single aperture for attachment of both HGAs 10, 56 and step 42 need not be formed. Otherwise, the structure and function of the paired set of interfitting HGAs 10, 56 is as described above.

Figure 7A:
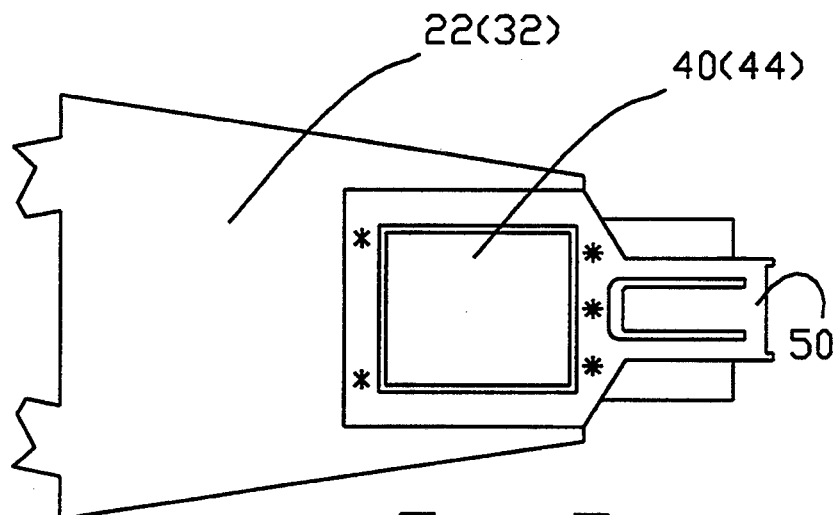
FIG. 7a shows a top perspective view of an HGA according to the present invention, with a flexure which extends around the surface window.
Figure 7B:
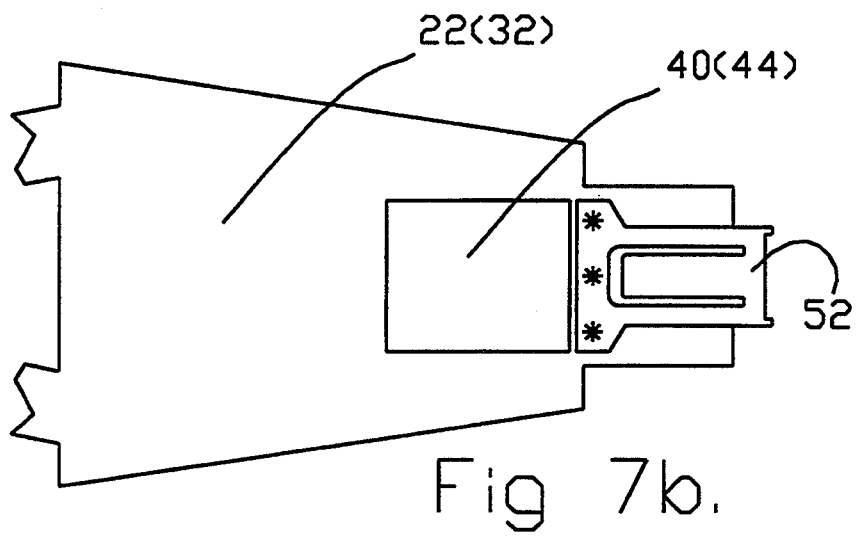
FIG. 7b shows a top perspective view of an HGA according to the present invention, with a flexure attached adjacent a distal edge of the surface window.
Figure 7C:
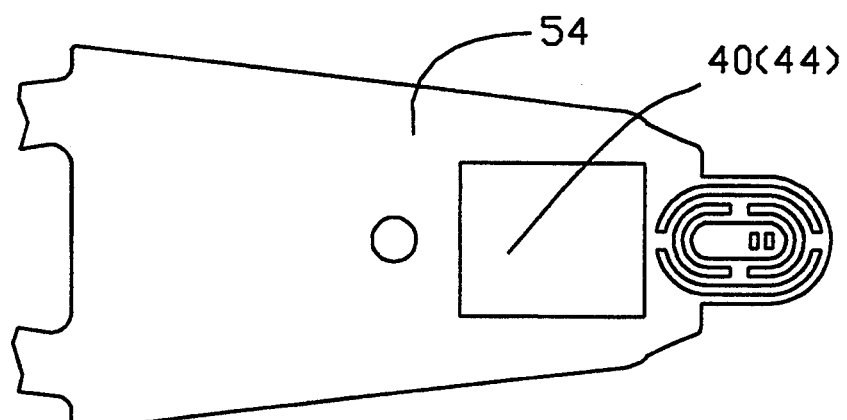
FIG. 7c shows a top perspective view of an HGA according to the present invention, with the flexure formed in one piece with the load beam.

It is to be understood that the essence of the present invention resides in the discovery that interleaving or interfitting of the load beams permits significant reductions in disk-to-disk spacing and other inherent advantages. Thus, the various components of the HGAs, including the base plate, the load beam, the flexure, and the head, may be of any suitable structure and configuration which will permit interleaving or interfitting as herein described. Accordingly, flexure 52 may be joined to load beam 22, 32 immediately distal of window 40, 44 (as shown in FIG. 7b) or flexure 50 may be formed to partially or completely surround window 40, 44 for greater stability (as shown in FIG. 7a). Also, any form of integrated load beam in which the flexure is formed in one piece with the load beam, such as load beam 54 shown in FIG. 7c, may be provided with an aperture or window 40, 44 to permit interleaving or interfitting of load beams as provided by the present invention. Currently, HGAs formed generally according to FIGS. 7b and 7c are preferred.

What is claimed:

1. In a disk drive for positioning transducer heads at selected locations on respective surfaces of a plurality of axially mounted rotatable disk-media, a head suspension for attachment to a rigid actuator arm of said disk drive, said head suspension comprising:
a first load beam joined by its proximal end to a first face of the rigid actuator arm, said first load beam having a transducer head on a distal end of said first load beam, a center surface of the first load beam provided with an aperture, sized and adapted for permitting a transducer head of a second load beam to project therethrough, so that the transducer head of the second load beam is in position for accessing a surface of a second disk media, said second disk media surface being opposed to a first disk media surface, which is in position for being accessed by the transducer head of the first load beam.

2. A head suspension according to claim 1, wherein the second load beam is attached to a second face of the rigid actuator arm, said second face opposed to the first face of the rigid actuator arm.

3. A head suspension according to claim 2, wherein the first and second load beams are attached to the rigid actuator arm along a common axis with each other.

4. A head suspension according to claim 3, wherein the first load beam is longer than the second load beam by approximately a length of the transducer head of the second load beam.

5. A head suspension according to claim 2, wherein the first load beam is attached to the first face of the rigid actuator arm at a point distally off-set from a point of attachment of the second load beam to the second face of the rigid actuator arm.

6. A head suspension according to claim 5, wherein the first and second load beams are of generally the same length.

7. A head suspension according to claim 5, wherein a distal portion of the rigid actuator arm is of reduced arm thickness.

8. A head suspension according to claim 2, wherein the second load beam is provided with an aperture similar in size and structure to the aperture of the first load beam.

9. A head suspension according to claim 2, wherein each of the first and second load beams is provided with stiffening rails which extend from edges of each of the first and second load beams.

10. A head suspension according to claim 9, wherein the stiffening rails of each of the first and second load beams extend toward a surface of that load beam to which its transducer head is mounted.

11. A head suspension according to claim 2, wherein the first and second load beams are each formed with an integrated flexure in one piece with each of the first and second load beams, respectively.

12. A lifter for a head suspension according to claim 2, wherein the lifter is sized and adapted to move sliders of the first and second load beams away from their respective disks by introducing the lifter between the first and second load beams near the proximal end of the first load beam and moving the lifter toward the distal end of the second load beam, thereby moving the first and second load beams away from each other and away from their respective disk surfaces.

13. A head suspension according to claim 2, wherein a flexure is attached to each load beam distally from the aperture.

14. A head suspension according to claim 13, wherein each flexure extends at least partially around each aperture.

15. A head suspension according to claim 1, wherein the first load beam is provided with stiffening rails which extend from edges of the first load beam.

16. A head suspension according to claim 15, wherein the stiffening rails extend toward a surface of the first load beam to which the first load beam's transducer head is mounted.

17. A head suspension according to claim 1, wherein the first load beam is formed with an integrated flexure in one piece with the load beam.

18. A head suspension according to claim 1, wherein the first and second load beams are essentially identical to each other to have essentially identical resonance characteristics.

19. A head suspension according to claim 1, wherein a flexure is attached to the first load beam distally from the aperture.

20. A head suspension according to claim 19, wherein the flexure extends at least partially around the aperture.

21. A paired set of upper and lower gimbal assemblies for attachment to first and second mutually opposing faces of a rigid actuator arm, respectively:
   (a) said upper gimbal assembly having
      a first load beam, joined by a first load beam proximal end to the first face of the rigid actuator arm, a surface of the first load beam provided with an aperture sized and adapted for permitting a second load beam transducer head to project therethrough, and
      a first flexure joined to the first load beam near the first load beam distal end, the first flexure extending beyond a distal end of the first load beam, the first flexure supporting a first transducer head in flying relationship to a first disk surface; and
   (b) said lower gimbal assembly having
      a second load beam, joined by a second load beam proximal end, to the second face of the rigid actuator arm, and
      a second flexure joined to the second load beam near the second load beam distal end, the second flexure extending beyond a distal end of the second load beam, the second flexure supporting the second transducer head to project through the aperture in the first load beam in flying relationship to a second disk surface in opposed relationship to said first disk surface.

22. A paired set of upper and lower gimbal assemblies according to claim 21, wherein the first and second load beams are attached to the rigid actuator arm along a common axis with each other.

23. A paired set of upper and lower gimbal assemblies according to claim 22, wherein the first load beam is longer than the second load beam by approximately a length of the transducer head of the second load beam.

24. A paired set of upper and lower gimbal assemblies according to claim 21, wherein the first load beam is attached to the first face of the rigid actuator arm at a point distally off-set from a point of attachment of the second load beam to the second face of the rigid actuator arm.

25. A paired set of upper and lower gimbal assemblies according to claim 24, wherein the first and second load beams are of generally the same length.

26. A paired set of upper and lower gimbal assemblies according to claim 24, wherein a distal portion of the rigid actuator arm is of reduced arm thickness.

27. A paired set of upper and lower gimbal assemblies according to claim 21, wherein the second load beam is essentially identical to the first load beam to have essentially identical resonance characteristics therewith.

28. A paired set of upper and lower gimbal assembles according to claim 21, wherein each of the first and second load beams is provided with stiffening rails which extend from edges of each respective load beam.

29. A paired set of upper and lower gimbal assemblies according to claim 28, wherein the stiffening rails of each of the first and second load beams extend toward a surface of that load beam to which its transducer head is mounted.

30. A paired set of upper and lower gimbal assemblies according to claim 21, wherein the first and second head suspensions are essentially identical to each other to have essentially identical resonance characteristics.

31. A lifter for a paired set of upper and lower gimbal assemblies according to claim 21, wherein the lifter is sized and adapted to move sliders of the first and second load beams away from their respective disks by introducing the lifter between the first and second load beams near the proximal end of the first load beam and moving the lifter toward the distal end of the second load beam, thereby moving the first and second load beams away from each other and away from their respective disk surfaces.

32. A gimbal assembly according to claim 21, wherein the first and second load beams are each formed with an integrated flexure in one piece with the load beam.

33. A paired set of first and second head suspensions according to claim 21, wherein a flexure is attached to each respective load beam distally from the aperture.

34. A paired set of first and second head suspensions according to claim 33, wherein each respective flexure extends at least partially around each respective aperture.

35. A load beam for use in a head suspension for attachment to a rigid actuator arm, said load beam joined by its proximal end to a first face of the rigid actuator arm, a surface of the load beam provided with an aperture sized and adapted for permitting a transducer head of a second load beam to project therethrough.

36. A load beam according to claim 35, provided with stiffening which extend from edges of the load beam.

37. A load beam according to claim 36, wherein the stiffening rails extend toward a surface of that load beam to which its transducer head is mounted.

38. In a disk drive for positioning transducer heads at selected locations on respective surfaces of a plurality of axially mounted rotatable disk media, said disk drive having a head suspension for attachment to a rigid actuator arm of said disk drive, said head suspension comprising:
   a first load beam joined by its proximal end to a first face of the rigid actuator arm, said first load beam having a transducer head on distal end of said first load beam, a center surface of the first load beam provided with an aperture, sized and adapted for permitting a transducer head of a second load beam to project therethrough, so that the transducer head of the second load beam is in position for accessing a surface of a second disk media, said second disk media surface being opposed to a first disk media surface, which is in position for being accessed by the transducer head of the first load beam and wherein the second load beam is attached to a second face of the rigid actuator arm opposed to the first face of the rigid actuator arm;
   a method of lifting transducer heads attached to each of the first and second load beams away from a disk surface with which said transducer head is in flying relationship, said method comprising:
   introducing a lifter between the first and second load beams near a proximal end of the first and second load beams; and
   moving the lifter toward a distal end of the first and second load beams, thereby moving the first and second load beams away from each other and moving the transducer heads away from their respective disk surfaces.

39. In a paired set of upper and lower gimbal assemblies for attachment to first and second mutually opposing faces of a rigid actuator arm, respectively:

(a) said upper gimbal assembly having
- a first load beam joined by a first load beam proximal end to the first face of the rigid actuator arm, a surface of the first load beam provided with an aperture sized and adapted for permitting a second load beam transducer head to project therethrough, and
- a first flexure joined to the first load beam near the first load beam distal end, the first flexure extending beyond a distal end of the first load beam, the first flexure supporting a first transducer head in flying relationship to a first disk surface; and (b) said lower gimbal assembly having
- a second load beam, joined by a second load beam proximal end, to the second face of the rigid actuator arm, and
- a second flexure joined to the second load beam near the second load beam distal end, the second flexure extending beyond a distal end of the second load beam, the second flexure supporting the second transducer head to project through the aperture in the first load beam in flying relationship to a second disk surface in opposed relationship to said first disk surface;

a method of lifting first and second transducer heads attached to the first and second load beams away from surfaces of first and second opposed disks with which said transducer heads, respectively, are in flying relationship, said method comprising:

introducing a lifter between the first and second load beams near a proximal end of the first and second load beams; and moving the lifter toward a distal end of the first and second load beams, thereby moving the first and second load beams away from each other and moving the transducer heads away from their respective disk surfaces.

40. A head suspension for attachment to a rigid actuator arm, said head suspension formed and adapted for interleaving with a second head suspension opposingly attached to the same rigid actuator arm, so as to allow a transducer head attached to the head suspension to project through the second head suspension in flying relationship to a disk surface.

41. A paired set of upper and lower gimbal assemblies for attachment to mutually opposing faces of a rigid actuator arm, respectively, said head suspensions formed and adapted for interleaving with each other, so as to allow a transducer head attached to one head suspension to project through an aperture in an opposite head suspension, such that transducer heads attached to each head suspension, respectively, are in flying relationship to respective opposed disk surfaces.

* * * * *